Feb. 4, 1969

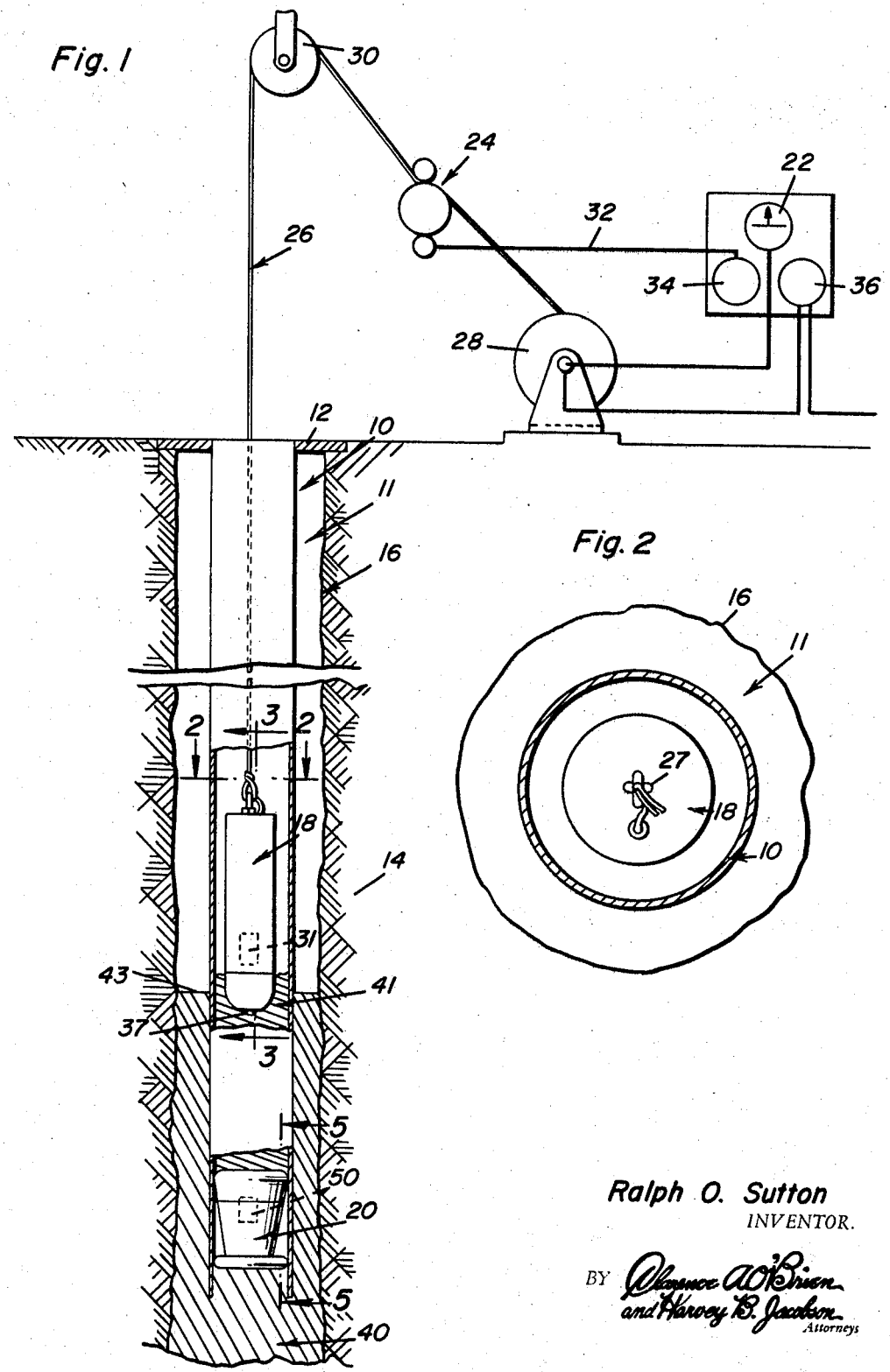

R. O. SUTTON 3,426,204

METHOD FOR MEASURING DEPTH OF TOP PLUG
IN WELL CASING CEMENTING

Filed July 15, 1965

Ralph O. Sutton
INVENTOR.

BY *Clarence A. O'Brien*
*and Harvey B. Jackson*
Attorneys

United States Patent Office 3,426,204
Patented Feb. 4, 1969

3,426,204
METHOD FOR MEASURING DEPTH OF TOP PLUG IN WELL CASING CEMENTING
Ralph O. Sutton, Salem, W. Va., assignor of fifty percent to Paul M. Chaney, Windsor, Va.
Filed July 15, 1965, Ser. No. 472,188
U.S. Cl. 250—83.6                    5 Claims
Int. Cl. H01j 39/28

ABSTRACT OF THE DISCLOSURE

A method of measuring the relative position of the top of a cementitious settable material which has been pumped downwardly within a well casing. The relative depth of the top of the cementitious material is determined by inserting a pre-formed top plug into the well casing and forcing the pre-formed top plug downwardly within the casing, and thus forcing the cementitious settable material ahead of the pre-formed top plug. A radiation detector, such as supported by wire line, is moved downwardly within the well casing to continuously monitor the relative depth of the pre-formed top plug which is provided with a receptacle having a suitable radiation emitting material therein. In a preferred embodiment the pre-formed top plug is formed of a drillable material and to avoid contamination of the well the radiation emitting material within the receptacle in the pre-formed top plug is preferably chosen to have a half-life of approximately the time necessary to permit the initial curing of the cementitious settable material being utilized.

This invention relates generally to a method utilized in cementing a well casing and more particularly to a method for measuring the relative position of a top plug utilized to force a casing cement down a well casing.

The normal procedure utilized heretofore in cementing casing in a well bore is to mix and pump into the casing a predetermined amount of a suitable hydraulic cement and then insert, or release if in a cementing head, a top plug. Water or drilling mud is then pumped into the casing above the top plug thereby forcing the plug and the cement downwardly out of the end of the casing and upwardly into the annulus between the exterior of the casing and the wall of the bore hole. The top plug is followed by a measuring line provided with a weight supposedly of sufficient size to pull the measuring line downwardly through the water or drilling mud, the paying out of the weighted line being recorded by a meter at the well head. The location or depth of the top plug was heretofore generally determined by the ability of the man operating the measuring device to determine when the weight attached to the measuring line touches, or sets down on the top plug. This method of determining the relative position of the depth of the top plug during a casing-cementing operation has often proved highly inaccurate since many factors enter into a cementing operation that can prevent a weight from contacting the top plug.

Frequently, the bore hole traverses a magnetic or loadstone strata making it difficult if not impossible to drop a weighted measuring line past such a magnetic region thereby making it virtually impossible to accurately determine the relative position of the top plug.

In addition, when a weighted line is utilized in an attempt to locate the position of the top plug the person lowering the line may overshoot the set-down of the measuring line weight on the top plug and accordingly pay more line into the well than actual depth of the top plug.

Another difficulty encountered in attempting to utilize a weighted line to determine the position of the top plug arises due to the fact that the throbbing of the mud pumps is at times so severe that it is difficult if not impossible for the person utilizing the weighted measuring line to distinguish between pump throb and the actual line weight set-down.

Further, in the event a split occurs in the casing and cement is displaced prematurely before having a chance to reach the bottom of the casing the movement of the top plug is sometimes slowed down or completely stopped. Accordingly, the person operating the measuring line overshoots the position of the top plug inasmuch as it is not expected to locate the top plug so high in the casing.

Still another problem encountered with the utilization of a weighted line to determine the relative position of a top plug is that which occurs when cavings, a crooked hole or a plugged casing shoe or a float collar prevents the displacement of the cement being pumped downwardly from the well casing into the annulus between the casing and the wall of the bore hole thereby greatly increasing the likelihood that the person operating the weighted line will overshoot the position of the top plug.

It is therefore a primary object of this invention to set forth the novel method of accurately measuring the position of the top plug during a well casing cementing operation.

Another object of this invention is to provide a method of measuring the depth of a top plug in an oil casing cementing operation wherein a radioactive substance is positioned in the top plug and a means is provided for accurately determining the position of the top plug by virtue of the radiation being emitted from the radioactive material encased within the top plug.

A further object of this invention is to provide a novel method for measuring the depth of a top plug in a well casing cementing operation wherein means are provided to overcome the effects of magnetism such as may be encountered in the cementing of the casing in some wells.

These together with other objects and advantages which will become subsequently apparent reside in the method as more fully hereinafter described and claimed, reference being had to the accompanying drawings forming a part hereof, wherein like numerals refer to like parts throughout, and in which:

FIGURE 1 is a vertical section of an oil well which includes a casing, a top plug, a body of unset cement, and a top plug depth measuring means;

FIGURE 2 is an enlarged horizontal sectional view taken substantially along the plane of the line 2—2 of FIGURE 1;

Figure 3:
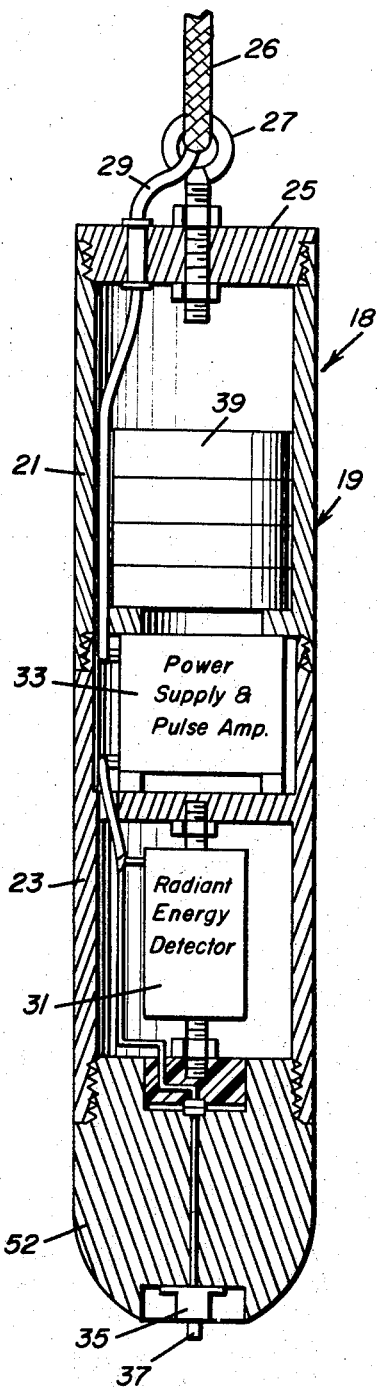
FIGURE 3 is an enlarged vertical sectional view of the top plug depth measuring means taken substantially along the plane of the line 3—3 of FIGURE 1.

Referring now to the drawings and FIGURE 1 in particular a well casing indicated generally at 10 which is supported at the well head by a support means indicated at 12, the casing 10 traverses a portion of the formation indicated generally at 14 which it is desirous of cementing to preclude the passage of undesirable fluids from the formation 14 into the bore hole 11 the wall of which is indicated generally at 16.

The novel method for measuring the depth of the top plug in a well casing cementing operation will be best understood by briefly referring to FIGURE 1, which graphically illustrates one step in the practice of the present invention wherein a radiation intensity detecting means indicated generally at 18 and controlled from the well head is shown being lowered into the casing 10 of the well 16 toward a top plug, or cementing plug indicated generally at 20 which is provided with a self-contained radiation source, in a manner to be described.

The radiation intensity detecting means 18 is provided with means for relaying the radiation intensity detected to the well head where such intensity may be indicated and/or recorded such as at the indicating meter illustrated schematically at 22. The position of the radiation intensity detecting means 18 within the well casing 10 at any given moment may be determined by a measuring head indicated generally at 24 which measuring head transmits a measurement of the amount of cable indicated generally at 26 being payed off a storage reel 28 over a suspension pulley 30 supported from a derrick, or the like, not shown.

The measurement taken by the measuring head 24 is relayed by a suitable means schematically shown at 32 to a depth indicating means schematically illustrated at 34. A storage reel control means schematically illustrated at 36, provides electrical power for the proper operation of the radiation intensity detecting means 18 through suitable rotary contacts on the storage reel assembly 28, in a manner not shown.

FIGURE 1 illustrates the practice of the present invention in connection with the cementing of the bottom of a well bore wherein a suitable amount of hydraulic cement such as indicated generally at 40 has been introduced into the casing 10 and forced downwardly by the combined action of the top plug 20 with the aid of suitable hydraulic or pneumatic pressure by a means not shown, thereby forcing the cement 40 out of the casing 10 and upwardly into the annulus defined by the casing 10 and the bore hole wall 16 thereby cementing the casing to preclude the contamination of a producing zone from an overlying water bearing strata, for example.

It will be appreciated by those skilled in the art of drilling and cementing casings that it is imperative that the position of the top plug 20 be accurately determined during the course of the cementing operation so as to give a valid indication as to the relative position of hydaulic cement 40 being extruded into the annulus between the casing 10 and the bore hole wall 16 in order to assure that the proper strata, or region, within the well, has been cemented. Accordingly, as the radiation intensity detecting means 18 is lowered toward the radiation source contained in the top plug 20 the relative intensity of the radiation may be observed at the indicating means 22 thereby enabling the person performing the cementing to accurately determine the depth of the top plug 20 by determining the amount of cable 26 which has been payed out.

As will be described in detail, the well should first be logged for any naturally occurring sources of radiation which might effect the radiation intensity detected by the means 18 in order that such natural radiation may be taken into consideration when locating the position of the top plug 20.

Referring now to FIGURE 3 is may be seen that the radiation intensity detecting means 18 comprises a generally cylindrical housing means 20 which is preferably fabricated from a plurality of threadably or otherwise removably secured sealed sections 21 and 23. The housing means 19 is preferably provided with a removably and sealingly secured end wall 25 provided with a suitable support eye 27 to which is secured the support cable 26 which is preferably of a dual-type provided with suitable insulated electrical conductors 29 which transmit power from the well head to a radiant energy detector such as a Geiger-Mueller detector of conventional design indicated generally at 31. The electrical connector cable 29 also powers a pulse amplifier 23 of conventional design which amplifies the output of the radiant energy detector 31 and relays such radiation intensity indication to the meter 22 at the well head.

The electrical conductor cable 29 also provides a suitable circuit to a normally closed electrical switch means 35 which is operatively connected to an indicator lamp, not shown, at the well head thereby enabling the utilization of the radiation intensity detecting means 18 for the measurement of the bottom hole measurement of total depth of the bore hole, which depth is generally necessary for starting a casing cementing operation. The switch 35 is operatively mounted within a plug 36 threadably received in the lower portion of the member 23. The switch 35 includes a plunger 37 which upon contacting a surface will open the switch contacts to interrupt the lamp circuit thereby giving a visual indication that the detecting means 18 has set down at the bottom of the hole. The detecting means 18 may be further provided with a plurality of weights indicated generally at 39 should it be necessary to weight the detecting means 18.

It will be understood, of course, that the detecting means 18 is preferably fabricated from non-magnetic material so as to substantially preclude the possibility of the detecting means 18 being magnetically attracted to a magnetized portion of the well casing 10.

Figure 4:
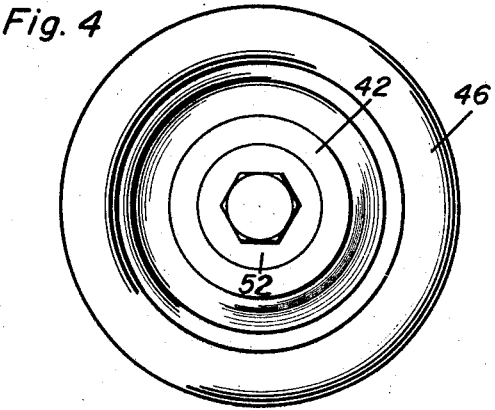
FIGURE 4 is a top plan view of the top plug of FIGURE 1.
Figure 5:
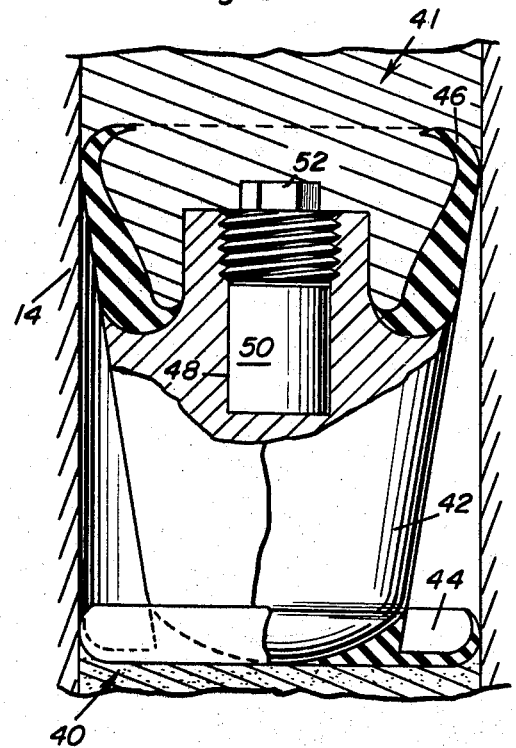
FIGURE 5 is an enlarged vertical sectional view of the top plug of FIGURE 1 taken substantially along the line 5—5 of FIGURE 1.

Referring now to FIGURES 4 and 5 it may be seen that the top plug 20 is of a construction wherein a drillable fibrous body 42 is provided with integrally secured resilient flanges 44 and 46, which includes a chamber 48 for the reception of a container 50 within which is sealed a suitable radioactive material, which material preferably has a half life expectancy of less than the normal time approximately 72 hours, required for the setting of the cement in a cementing operation thereby assuring that the bore of the well will not be contaminated with radioactive waste material such as might interfere with any subsequent cementing operations required.

The top of the chamber 48 within the body 42 of the top plug 20 is removably sealed by a suitable plug 52 which is threadably received in suitable threads provided in an upper portion of the bore of the chamber 48.

Specifically the method of the present invention is practiced by placing a container 50 provided with a suitable amount of a radioactive material in the chamber 48 of the top plug 42, which container is sealed therein by means of the plug 52.

An initial radiation reading is taken at the well head with the top plug 20 in close proximity to the energized radiation detecting means 18 thereby giving an indication as to the radiation intensity reading to be expected when the detecting means 18 comes into close proximity with the top plug 20 in the well casing. The radiation intensity detecting means 18 is then lowered into the well and a radiation log is made in order to detect the relative position and intensity of any naturally occurring sources of radiation which may occur in the well thereby assuring that such natural radiation sources will not interfere with the detecting of the top plug 20.

The radiation intensity detecting means 18 is then withdrawn from the well and the cementing operation is then carried forth in a manner wherein a suitable amount of hydraulic cement such as indicated at 40 is pumped down the casing 10 through a cementing head, not shown, for example, after which the top plug 20 containing the radiation source 50 is inserted into the casing. The top plug 20 is forced downwardly in the well casing 10 with a suitable fluid such as a drilling mud, indicated generally at 41, which is pumped into the casing 10 by a conventional mud pump or the like connected to the casing in a conventional manner not shown.

Simultaneously the radiation intensity detecting means 18 is lowered in the casing 10 to determine the depth of the top plug 20. From the description set forth heretofore it will be appreciated that the radiant energy detector 31 of the detecting means 18 will detect the radiation from the material within the container 50 and such radiation detected will be amplified by the means 33 and relayed to the well head and accordingly indicated on the meter 22 thereby giving a visual or other indication of the proximity of the detecting means 18 to the top plug 20. The actual depth of the top plug 20 within the casing 10 may then be accurately determined by reading the length of cable 26 which has been payed out from the storage reel 28, which reading may be visually or otherwise indicated by the indicator means 34.

Accordingly, it may be seen that the method of the present invention permits a highly accurate placement of the top plug 20 thereby assuring that the desired amount of cement 40 has been forced out of the well casing 10 into the annulus 11 defined by the casing 10 and the bore hole wall 16. In addition, the accurate determination of the depth of the top plug 20 greatly facilitates the subsequent locating of the cement top as indicated at 43 within the annulus between the casing 10 and the bore hole wall 16.

It will be understood, of course, that while the radiant energy source within the container 50 has been described of a type emitting gamma radiations and the radiant energy detecting means 31 has been described as that which detects gamma radiations obviously other radiant energy sources and detectors may be employed such as sources and detectors of neutrons, beta particles, etc.

From the foregoing it may be seen that many of the difficulties heretofore encountered in locating the depth or position of a top plug during the cementing of a casing are obviated by the method of the present invention inasmuch as the accurate determination of the position of the top plug 20 is dependent primarily upon the proximity of the radiation detecting means 31 to the radiation source 50 within the top plug 20 and is accordingly not dependent solely upon the length of cable 26 lowered into the casing 10 such as was commonly done heretofore.

Although the present method has been described, for illustrative purposes only, with regard to the cementing of the bottom portion of the bore hole it will be understood that the method of the present invention can be utilized for numerous other applications attendant to the cementing of the casing and accordingly I do not wish to be limited except by the scope of the appended claims.

What is claimed as new is as follows:

1. The method of measuring the depth of a preformed top plug and the relative depth of the top of a body of cementitious settable material generally adjacent to and underlying said pre-formed top plug in the cementing of a well casing wherein said preformed top plug is provided with a radiation source and a radiation detector is employed to locate the position of the preformed top plug within said well casing thereby determining the position of the top of the body of cementitious settable material in the well casing.

2. In a method of cementing an annulus between a well casing and a bore hole wall the steps of pumping a suitable amount of settable material into the casing, inserting a preformed top plug provided with a radiation source into the casing on top of the settable material, forcing the preformed top plug down the casing with a suitable amount of fluid thereby forcing the settable material downwardly in the casing ahead of the preformed top plug, and determining the position of the preformed top plug by inserting a wire line supported radiation detector tool downwardly into the casing to determine the proximity of the radiation source to the radiation detector, and determining the depth of the top plug by the length of wire line payed into the well.

3. In a method for measuring the depth of a top plug in a well casing cementing operation the steps of, inserting a preformed top plug provided with a radiation source into the casing on top of the settable material being pumped into the casing, forcing the preformed top plug down the casing thereby forcing the settable material downwardly in the casing ahead of the preformed top plug, inserting a wire line radiation detector adapted to relay a relative radiation indication to the well head into the casing, detecting the position of the preformed top plug by observing the maximum level of radiation detected by the wire line radiation detector as it is lowered into the casing and determining the depth of the wire line radiation detector by observing the length of wire line payed into the well casing.

4. The method of claim 1 wherein said radiation source comprises a radio-active material having a half life expectancy of approximately the time required for setting of the settable material.

5. A method for determining the location of the top portion of settable material in a borehole which comprises placing the settable material in the borehole with a preformed top plug generally interposed between the settable material and a fluid utilized to force the settable material downwardly in the borehole, said preformed top plug being provided with a radiation source, and then logging the borehole with a device which is sensitive to rays emitted by the radiation source whereby the position of the preformed top plug, and thus the position of the top of the cement in the borehole, is determined by observing the initial position of maximum radiation.

References Cited

UNITED STATES PATENTS

| 2,220,205 | 11/1940 | Buckley | 250—106 |
| 2,453,456 | 11/1948 | Piety | 250—83.6 |
| 2,549,109 | 4/1951 | McPhee | 250—106 |
| 2,685,038 | 7/1954 | Hoss | 250—106 X |

ARCHIE R. BORCHELT, *Primary Examiner.*

U.S. Cl. X.R.

250—106